United States Patent
Lindsey et al.

(10) Patent No.: US 12,353,551 B1
(45) Date of Patent: Jul. 8, 2025

(54) RANSOMWARE BEHAVIORAL KERNEL MODEL

(71) Applicant: Halcyon Tech, Inc., Austin, TX (US)

(72) Inventors: Clark Lindsey, Loudon, TN (US); Jonathan Miller, Poway, CA (US)

(73) Assignee: Halcyon Tech, Inc., Austin, TX (US)

( * ) Notice: Subject to any disclaimer, the term of this patent is extended or adjusted under 35 U.S.C. 154(b) by 0 days.

(21) Appl. No.: 19/084,548

(22) Filed: Mar. 19, 2025

(51) Int. Cl.
*G06F 21/00* (2013.01)
*G06F 21/56* (2013.01)

(52) U.S. Cl.
CPC ...... *G06F 21/566* (2013.01); *G06F 2221/034* (2013.01)

(58) Field of Classification Search
CPC .................................................... G06F 21/56
See application file for complete search history.

(56) References Cited

U.S. PATENT DOCUMENTS

| | | | |
|---|---|---|---|
| 2022/0100855 A1* | 3/2022 | Kumar | G06F 21/51 |
| 2024/0296222 A1* | 9/2024 | Portase | G06F 21/566 |

* cited by examiner

*Primary Examiner* — Tri M Tran
(74) *Attorney, Agent, or Firm* — Jones Day

(57) ABSTRACT

Time series behavioral data derived from operating system events on a monitored computing device is monitored at a kernel level. Based on this monitoring, a feature vector is populated or updated with features indicative of ransomware. These features are extracted or otherwise derived from the time series behavioral data. The feature vector can be input into a machine learning model (e.g., a modified gated recurrent unit, etc.) to characterize whether the time series behavioral data is indicative of a ransomware event. Data indicating a probability of a ransomware event occurring is provided to a consuming application or process. One or more remediation actions to thwart the ransomware event can be initiated when the probability level is above a threshold.

20 Claims, 3 Drawing Sheets

RANSOMWARE BEHAVIORAL KERNEL MODEL

TECHNICAL FIELD

The subject matter described herein relates to techniques for identifying and countering ransomware attacks using one or more models executing in the kernel layer.

BACKGROUND

Ransomware attacks typically exploit vulnerabilities within specific applications to gain access to a system, exfiltrate sensitive data, and encrypt critical files, often utilizing sophisticated encryption algorithms and automated tools to maximize disruption and increase the pressure on victims to pay the ransom. Ransomware can utilize features such as targeted application exploitation, lateral movement within the application's environment, and the ability to identify and prioritize high-value data within the application itself. Detecting such actions quickly is critical in thwarting such attacks making local decision-making critical.

SUMMARY

Time series behavioral data derived from operating system events on a monitored computing device is monitored at a kernel level. Based on this monitoring, a feature vector is populated or updated with features indicative of ransomware. These features are extracted or otherwise derived from the time series behavioral data. The feature vector can be input into a machine learning model (e.g., a modified gated recurrent unit, etc.) to characterize whether the time series behavioral data is indicative of a ransomware event. Data indicating a probability of a ransomware event occurring is provided to a consuming application or process.

The monitoring can include tracing and logging events raised by user-mode applications and kernel-mode drivers. The tracing and logging can be based on Event Tracing for Windows (ETW) messages. The ETW messages can be generated from interaction points comprising: process, filesystem, network, and registry interaction points.

The modified gate recurrent unit neural network executes in the kernel level. The features indicative of ransomware can be based on kernel level operations such as, for example, file creation or modification operations and the like.

The features indicative of ransomware can be based on attributes of files used by the operating system.

The modified gated recurrent unit can be configured to ignore the inputted feature vector when deciding how much of a previous hidden state should be forgotten when generating a new hidden state. The modified gated recurrent unit can pass the new hidden state into a dense classification layer with a single neuron and a sigmoid activation function.

A training data set can be generated using a first plurality of messages generated based on operating system events during benign operating conditions and using a second plurality of messages generated based on operating system events during simulated or actual ransomware events, the first plurality of messages being labeled different than the second plurality of messages. The training data set can be used to train the modified gated recurrent unit.

The consuming application or process can initiate one or more ransomware remediation actions when the probability of the ransomware event occurring is above a pre-defined value. The ransomware remediation actions can take various forms including, for example, initiating restrictions on functionality of one or more processes or applications, preventing creation or modification of files on the monitored computing device, and the like.

In some cases, the consuming application or process transmits a message to a remote monitoring platform when the probability of the ransomware event occurring is above a pre-defined value. The remote monitoring platform can, in response to receipt of the transmitted message, initiate one or more ransomware remediation actions on the monitored computing device by sending messages to an agent executing on the monitored computing device.

In an interrelated aspect, time series behavioral data is monitored at a kernel level which is derived from operating system events on a monitored computing device. Based on this monitoring, a feature vector is populated and/or updated with features indicative of ransomware. The feature vector can be input into a ransomware behavioral kernel model (e.g., a modified gated recurrent unit, etc.) to determine a probability that the time series behavioral data is indicative of a ransomware event. One or more ransomware remediation actions can be initiated to thwart the ransomware event when the determined probability is above a threshold. The ransomware behavioral kernel model can be trained using a training data set generated using a first plurality of messages generated based on operating system events during benign operating conditions and using a second plurality of messages generated based on operating system events during simulated or actual ransomware events, the first plurality of messages being labeled different than the second plurality of messages.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to a techniques for characterizing ransomware attacks and updating agents executing on various endpoints (i.e., monitored computing devices) to more effectively address or otherwise thwart security events such as ransomware or activities otherwise which causing monitored systems (i.e., endpoints having an agent installed thereon, etc.) to operate in an undesired manner. In particular, the current subject matter is directed to advanced techniques for monitoring ransomware at the kernel level. The current techniques are advantageous in that they are able to monitor a massive number of generated events in a brief period and determine which of those events are relevant to a potential ransomware attack all while also not materially impacting system performance (including memory consumption). Such an arrangement is also advantageous in that kernel-level security decisions allow for better system protection by preventing adversaries (i.e., malicious actors) from disabling anti-malware user mode services at the application level. Still further, the current subject matter is advantageous in that it allows for local decisions which can result in more rapid detection of a ransomware attack as opposed to a cloud-only ransomware detection approach.

Figure 1:
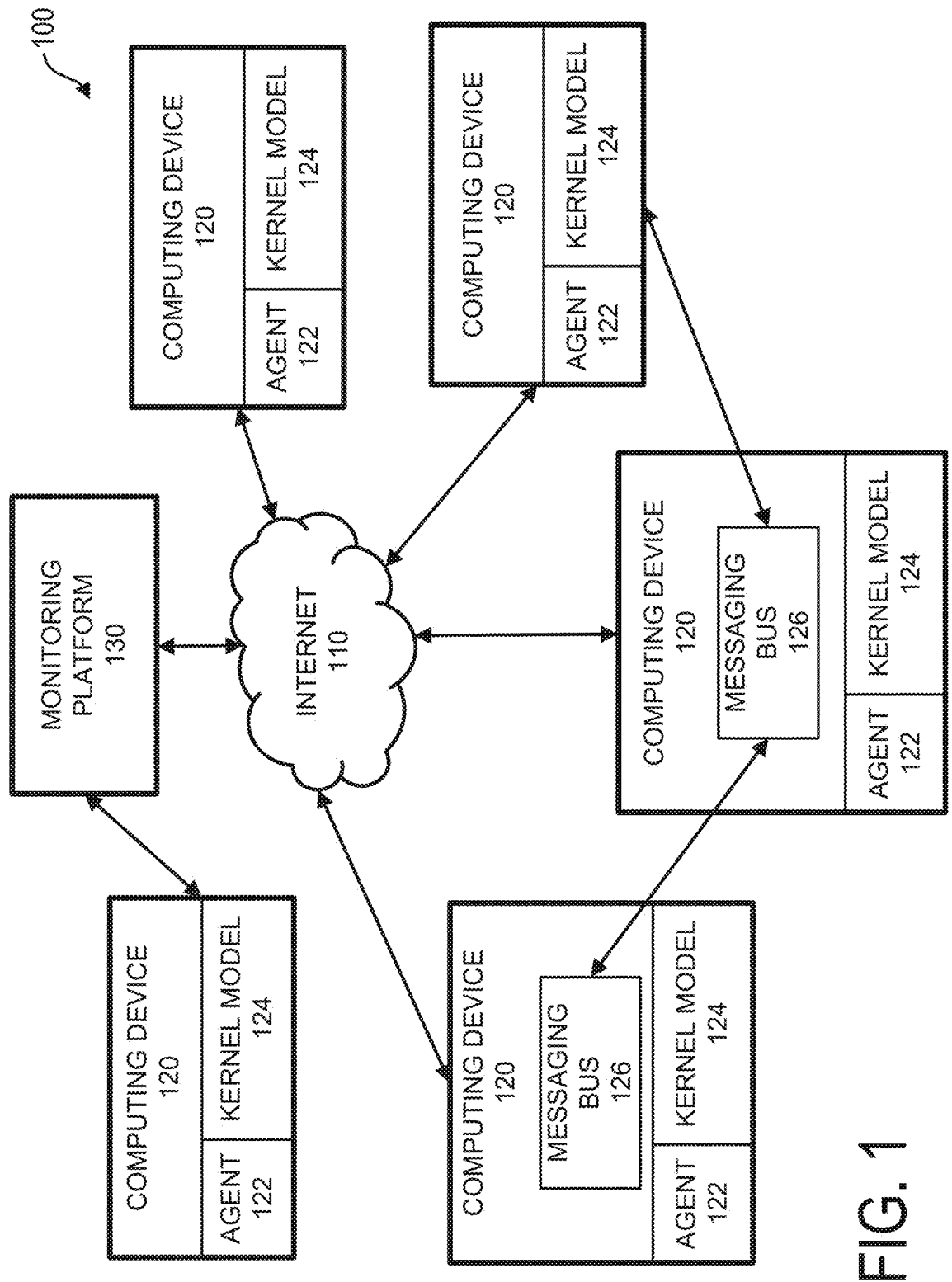
FIG. 1 is an architecture diagram illustrating aspects of a security monitoring platform in which agents are installed on computing devices.

FIG. 1 is an architecture diagram 100 in which a monitoring platform 130 can monitor and protect a plurality of computing devices 120 (e.g., endpoints, etc.) by way of the Internet 110 or by way of direct connections (e.g., on-premise protection, etc.). Each of the monitored computing device 120 can include at least one agent 122 as well as a kernel model (or models) 124 executing thereon which can individually or in combination be used to locally analyze security events and/or to transmit data to the monitoring platform 130 which characterize security events. In some cases, the kernel model 124 solely works locally while, in other variations, the kernel model 124 works in coordination with the monitoring platform 130.

In some cases, the computing device 120 can execute a messaging bus 126 which selectively processes and transmits messages characterizing security events. The messaging bus 126 can generate, process, and transmit messages that are derived from security events generated or identified by the agent 122 and/or from other sources executing on the corresponding computing device 120 (including within the kernel space 124) or a peer computing device 120. Further details regarding the messaging bus 126 can be found in U.S. Pat. No. 12,130,914, the contents of which are hereby fully incorporated by reference.

In some cases, the agent 122 can be installed after a security event such as a ransomware attack. With this example, ransomware has already infiltrated at least one of the computing devices 120 and encrypted certain files for which a decryption key will be provided in exchange for a ransomware payment. In such cases, the agent 122 can be installed on the computing device(s) 120 to facilitate remediation of the security event. In the case of ransomware, the remediation can include decrypting the encrypted files and/or transporting the encrypted files to the monitoring platform 130 (or to a different cloud-based service). In order to facilitate local decryption, the agent 122 can collect information characterizing the encrypted files. For example, the agent 122 can identify or generate a list of files that were encrypted as well as the key material used in the encryption of each particular file. In order to identify the encrypted files, an algorithm can analyze the file name, extension and contents of a particular file to see if it is encrypted. Key material, in this context, refers to variables needed to create a key which can be dependent on the utilized encryption algorithm. The encryption information can be used to generate and deliver decryptor logic (i.e., logic/code to decrypt encrypted files) in the form of a surveyor transported in the form of a surveyor package. A surveyor can be a standalone component that can be run by the agent 122 in order to extend the functionality of the agent 122. The surveyor, when executed by the agent 122, can cause the encrypted files to be decrypted. In some cases, even if the decryptor logic is the same (i.e., a same encryption technique is used for all files), the key materials for each file might be different. Further details regarding surveyors and the updating of agents can be found in U.S. patent application Ser. No. 18/948,343 filed on Nov. 14, 2024, the contents of which are hereby fully incorporated by reference.

As noted above, the current subject matter is directed to enhanced kernel level techniques for monitoring the computing devices 120 using a kernel model 124. It will be appreciated that while the narrative below is directed to the use of a single kernel model 124 two or more models can be used depending on the desired configuration (i.e., in parallel, in sequence, etc.). The kernel model 124 can be rules-based, heuristics-based and/or machine learning based and ingest features derived from various operating system events (which can be for defined windows and/or for defined number of events). As an example, the kernel model 124 can make determinations regarding whether a ransomware event is occurring based on a sliding window (e.g., a 10 second window, etc.).

The kernel model 124 can be a driver in that it can access or otherwise certain operating system events. Unlike application level models which use floating-point arithmetic, the kernel model 124 is restricted to fixed point arithmetic. Further, the kernel model 124 is performant in that it does not cause any noticeable operation system lag while only requiring a small memory footprint.

The kernel model 124 can be more compact than models executed in the cloud by the monitoring platform 130. For example, the kernel model 124 can utilize hundreds of features over relatively small observable amounts of time (i.e., hours, minutes, etc.) while the monitoring platform 130 can execute models utilizing thousands of features derived from longer windows of time (i.e., months, weeks, days, etc.) which necessarily requires more compute.

The kernel model 124 can comprise one or more machine learning models. These machine learning models, for example, can be trained using various data sets. One example data set can be generated based on operating system messages which are logged in order to trace and record kernel-mode driver activity on the computing device 120. Different types of operating system messages can be analyzed with the current subject matter. With WINDOWS operating system, the messages can be Event Tracing for Windows (ETW) messages. Such messages, in some cases, can characterize developer-defined events and can additionally include binary data.

In order to generate a training dataset, a kernel driver (i.e., a software component that allows an operating system component to communicate and control certain hardware devices, etc.) can be instrumented with ETW messages at various interaction points. These interaction points can include, for example, process, filesystem, network and registry interactions. An ETW controller can be configured to capture the events or otherwise derive information characterizing the events to a logged trace file (e.g., an extract, transform, and load (ETL) file). The monitored computing device used to generate the ETW messages can be operated under normal conditions (i.e., without any malicious software executing) and these messages can be labeled for training purposes (e.g., labeled as benign, etc.). In the addition, ETW messages can be generated under simulated or actual ransomware attacks in a safe environment (e.g., virtual machine, sandboxed environment, etc.). Such ETW messages can be labeled as malicious (i.e., indicative of ransomware, etc.).

In order to determine the model parameters of the kernel model 124, the labeled ETL dataset can be converted into input for an application using graphics processing unit (GPU) computing. Using the training set, the GPU-accelerated application can be configured to find the weights and biases with the smallest loss. These weights and biases (parameters) can be saved with the model configuration (hyperparameters). Several iterations can be performed each time using different algorithms and hyperparameters.

To find the best model (hyperparameters and parameters), the validation dataset can be run against each possibility in order to find the configuration with the smallest loss. The model parameters can then be quantized from floating-point to fixed-point. Quantization in this context reduces the model size, increases speed, and allows the model to run in the kernel driver due to the limited resources available. The result is a fully trained quantized model which is ready for kernel driver ingestions and which also run at higher levels such as userland. The model accuracy can be verified in userland using the test data. If the test dataset performs badly, the reasons for the poor performance can be determined so that a new model that addresses such reasons can be created. If the test dataset performs well, the kernel model 124 can be accordingly updated.

The kernel model 124 can include a behavior policy which defines (via rules, heuristics, etc.) what actions to take when certain states are determined. As an example, the policy can specify that a "possible ransomware event on" message can be sent when the kernel model 124 determines that a ransomware event is occurring. The policy can also specify that a "possible ransomware event off" message can be sent when the kernel model 124 determines that the ransomware event is no longer occurring. Further, the policy can specify that when policy is active and the rules specified by the policy indicate that a possible ransomware is occurring, functionality of certain applications can be disabled or limited. For example, a trusted application executing during a possible ransomware event can be prevented from running a nefarious command line and the like.

The kernel model 124 can be configured to characterizing different ransomware behaviors including various components such as antecedent, behavior and consequence. With human bias being the enemy to accuracy, capturing behaviors of interest and using algorithms to decide key antecedents becomes critical to successfully thwarting a ransomware event. As used herein, antecedent refers to an event, situation or action preceding a ransomware behavior of interest and is logically related to the behavior's occurrence, behavior refers to the overt, observable, and measurable action that is of interest with regard to ransomware predictions, and consequence refers to the event, situation, or action following the behavior of interest which is logically related to the behavior's occurrence.

The kernel model 124 can ingest features from different sources/events. These features can be extracted or otherwise derived from various operating system events or other operations being executed by the computing device 120.

Diverse features can be extracted or otherwise derived from operations or attributes associated with files. For example, features can be extracted or otherwise derived from file extension validation information. Length check maximums/minimums can be used as well as known bad patterns (e.g., poison, etc.), randomness of a file extension, the use of a file extension (e.g., .file, .jpg, .poison, etc.) as part of the file name, and the like. Features can be extracted or otherwise derived from randomness verifications. A randomness check can be run to characterize length, uppercase, lowercase, and multiple digits and features can be generated which characterize such a randomness check.

Features can be extracted or otherwise derived from operations relating to creation or opening of files. These operations can include user requested for desired access, create and disposition options, file attributes, and share access operations. Relatedly, features can also be extracted or otherwise derived from operations associated with renaming of a file.

Features can be extracted or otherwise derived from operations associated with one or more of: creating a link to a file, changing file attributes, deleting a file, cleaning a file, changing a file pointer position, allocating a file size, setting a valid data length for a file, starting a file-related process, and/or stopping a file-related process.

Figure 2:
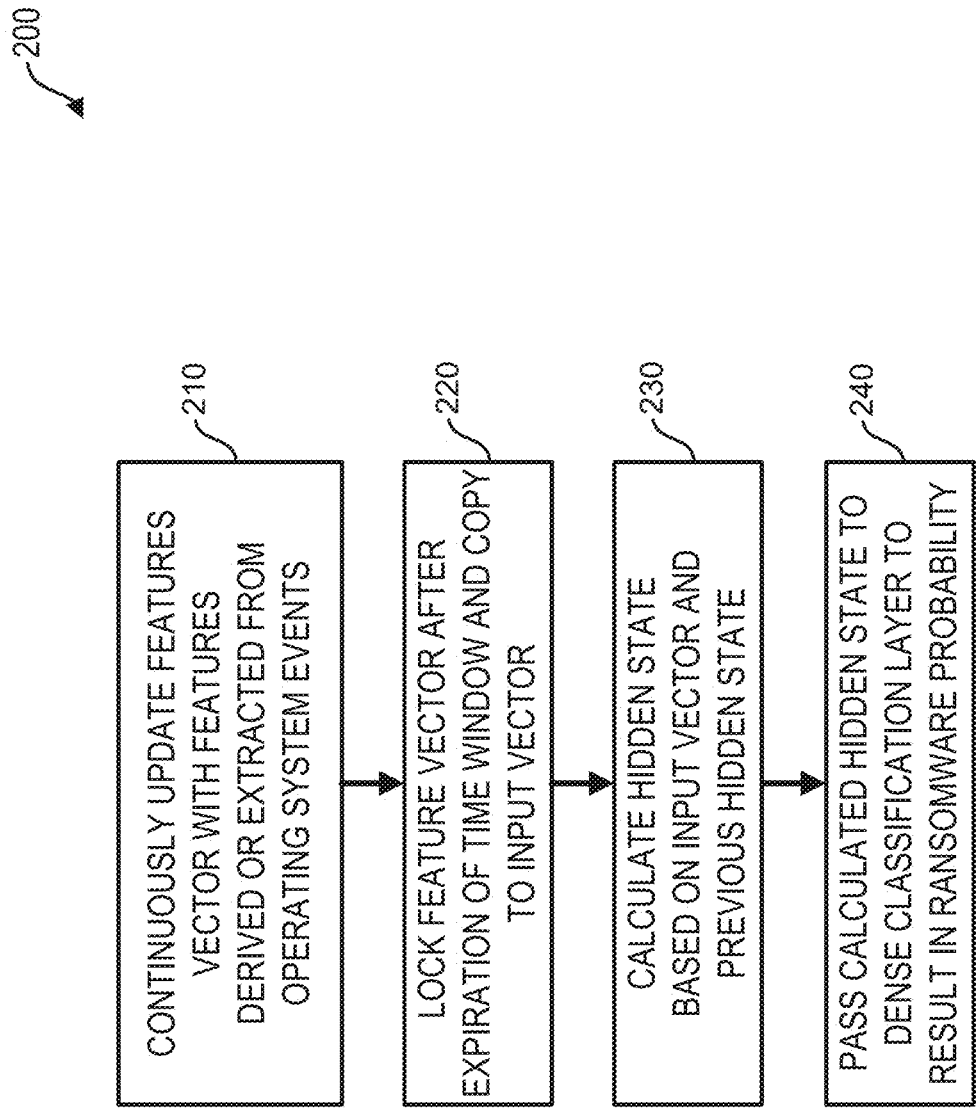
FIG. 2 is process flow diagram illustrating an inference workflow for a kernel model executing in a kernel layer of a monitored computing device.

The kernel model 124 can take various forms. In some variations, the kernel model 124 can be characterized as a modified Gated Recurrent Unit (GRU), a type of recurrent neural network (RNN). Some or all of the features ingested by the kernel model 124 can be process agnostic which imply system-wide actions (which in turn can be indicative of a ransomware event). A sample inference workflow for the kernel model 124 can be seen in diagram 200 of FIG. 2.

A feature vector $\vec{v}$ is continuously updated at 210, with features (such as those extracted or derived from the above referenced operations and attributes). Thereafter, at 220, in a system thread, after expiration of a time window (e.g., a brief time period such as 800 milliseconds, etc.), the feature vector $\vec{v}$ is locked and copied to current input vector $\vec{x}$. The feature vector $\vec{v}$ is cleared and unlocked allowing for feature vector to be updating for the next successive time window. The kernel model 124 then, at 230, uses the previous hidden state $\vec{h}_{t-1}$ and the current input vector $\vec{x}$ in order to calculate the new hidden state $\vec{h}_t$. Such an exemplary implementation can differ from the standard GRU in the Reset Gate by ignoring the input vector $\vec{x}$ when deciding how much of the previous hidden state $\vec{h}_{t-1}$ should be forgotten. Subsequently, at 240, the new hidden state $\vec{h}_t$ is passed into a dense classification layer with a single neuron and a sigmoid activation function. The responsive output value is the probability that the behavior is from ransomware (i.e., that a ransomware event is occurring on the computing device 120). Behavior in this context can be actions performed by one or more processes and/or one or more applications.

If the kernel model 124 makes a determination that a ransomware event is occurring/likely occurring, the kernel driver can go into a protective mode. For example, the kernel driver can restrict possible actions from a user, application, and/or process.

Also, the kernel model can notify agent 122 of the possible ransomware event, so that the agent 122 can configure more restrictions. For example, a restriction can include one or more of: preventing users from changing passwords, preventing file deletion, duplication or transport, preventing certain applications and/or processes from executing and the like. Agent 122 can notify the monitoring platform 130 of the possible ransomware event. The monitoring platform 122 can then send notifications to a threat response team to initiate various operations to cause the tenant (i.e., the system being monitored) to transition to a lockdown mode. The monitoring platform 130 can also send various messages to the agents 122 in the various computing devices 120 so as to automatically lock down or otherwise limit local functionality to help thwart the ransomware attack.

Figure 3:
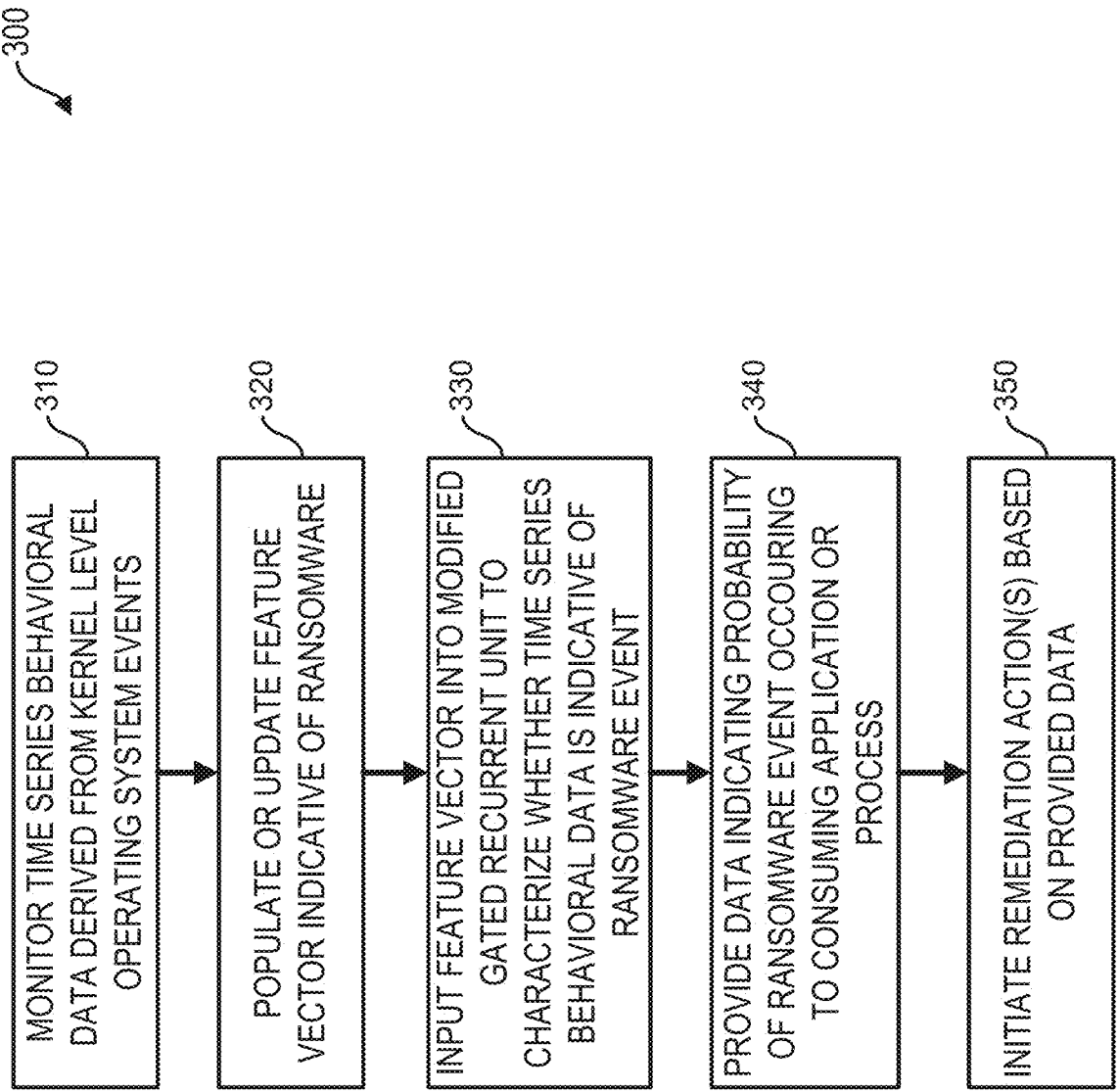
FIG. 3 is a diagram illustrating a process for countering ransomware through the use of a kernel model.

FIG. 3 is a process flow diagram 300 in which, at 310, time series behavior data which is derived from operating system events is monitored at a kernel level. This monitoring is used, at 320, to populate or update a feature vector with features indicative of ransomware. The feature vector is input, at 330, into a modified gated recurrent unit to characterize whether the time series behavioral data is indicative of a ransomware event. Data is subsequently provided, at 340, to a consuming application or process indicating a probability of a ransomware event occurring. Depending on the provided data (e.g., the probability level), at 350, one or more remediations can be undertaken.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED, OLED, or LCD screen/monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
monitoring, at a kernel level, time series behavioral data derived from operating system events on a monitored computing device;

populating or updating, based on the monitoring, a feature vector with features indicative of ransomware;

inputting the feature vector into a modified gated recurrent unit to characterize whether the time series behavioral data is indicative of a ransomware event, the modified gated recurrent unit ignoring the inputted feature vector when deciding how much of a previous hidden state should be forgotten when generating a new hidden state and passing the new hidden state into a dense classification layer with a single neuron and a sigmoid activation function; and providing data to a consuming application or process indicating a probability of a ransomware event occurring, the probability being used to determine whether to initiate one or more remediation actions to thwart the ransomware event.

2. The method of claim 1 further comprising:
extracting or deriving features based on the monitored time series behavior data, at least a portion of the extracted or derived features being used to populate or update the feature vector.

3. The method of claim 1, wherein the monitoring comprises:
tracing and logging events raised by user-mode applications and kernel-mode drivers.

4. The method of claim 3, wherein the tracing and logging is based on Event Tracing for Windows (ETW) messages.

5. The method of claim 4, wherein the ETW messages are generated from interaction points comprising: process, filesystem, network, and registry interaction points.

6. The method of claim 1, wherein the modified gated recurrent unit executes in the kernel level.

7. The method of claim 1, wherein the features indicative of ransomware are based on kernel level operations.

8. The method of claim 7, wherein the kernel level operations comprise file creation or modification operations.

9. The method of claim 1, wherein the features indicative of ransomware are based on attributes of files used by the operating system.

10. The method of claim 1 further comprising:
generating a training data set using a first plurality of messages generated based on operating system events during benign operating conditions and using a second plurality of messages generated based on operating system events during simulated or actual ransomware events, the first plurality of messages being labeled different than the second plurality of messages;
wherein the training data set is used to train the modified gated recurrent unit.

11. The method of claim 1, wherein the consuming application or process initiates the one or more remediation actions when the probability of the ransomware event occurring is above a pre-defined value.

12. The method of claim 11, wherein the ransomware remediation actions comprise: initiating restrictions on functionality of one or more processes or applications.

13. The method of claim 11, wherein the remediation actions comprise:
preventing creation or modification of files on the monitored computing device.

14. The method of claim 1, wherein the consuming application or process transmits a message to a remote monitoring platform when the probability of the ransomware event occurring is above a pre-defined value.

15. The method of claim 14, wherein the remote monitoring platform, in response to receipt of the transmitted message, initiates one or more ransomware remediation actions on the monitored computing device by sending messages to an agent executing on the monitored computing device.

16. A computer-implemented method comprising:
monitoring, at a kernel level, time series behavioral data derived from operating system events on a monitored computing device;
populating or updating, based on the monitoring, a feature vector with features indicative of ransomware;
inputting the feature vector into a modified gated recurrent unit executing in the kernel level to determine a probability that the time series behavioral data is indicative of a ransomware event, the modified gated recurrent unit ignoring the inputted feature vector when deciding how much of a previous hidden state should be forgotten when generating a new hidden state and passing the new hidden state into a dense classification layer with a single neuron and a sigmoid activation function; and
initiating one or more remediation actions to thwart the ransomware event when the determined probability is above a threshold.

17. The method of claim 16 further comprising:
generating a training data set using a first plurality of messages generated based on operating system events during benign operating conditions and using a second plurality of messages generated based on operating system events during simulated or actual ransomware events, the first plurality of messages being labeled different than the second plurality of messages; and
training the modified gated recurrent unit using the generated training data set.

18. A computer-implemented method comprising:
monitoring, at a kernel level, time series behavioral data derived from operating system events on a monitored computing device;
populating or updating, based on the monitoring, a feature vector with features indicative of ransomware;
inputting the feature vector into a ransomware behavioral kernel model executing in the kernel level to determine a probability that the time series behavioral data is indicative of a ransomware, the ransomware behavioral kernel model comprising a modified gated recurrent unit configured to (i) ignore the inputted feature vector when deciding how much of a previous hidden state should be forgotten when generating a new hidden state and (ii) pass the new hidden state into a dense classification layer with a single neuron and a sigmoid activation function; and
initiating one or more remediation actions to thwart the ransomware event when the determined probability is above a threshold;
wherein the ransomware behavioral kernel model is trained using a training data set generated using a first plurality of messages generated based on operating system events during benign operating conditions and using a second plurality of messages generated based on operating system events during simulated or actual ransomware events, the first plurality of messages being labeled different than the second plurality of messages.

19. The method of claim 18, wherein the remediation actions comprise: initiating restrictions on functionality of one or more processes or applications.

20. The method of claim 18, wherein the remediation actions comprise:

preventing creation or modification of files on the monitored computing device.

\* \* \* \* \*